United States Patent [19]

Gradin et al.

[11] 4,433,344

[45] Feb. 21, 1984

[54] AUTOMATIC TELEVISION ANTENNA CONTROL SYSTEM

[75] Inventors: James H. Gradin, Irvine; John S. Joseph, Los Alamitos, both of Calif.

[73] Assignee: Sundstrand Data Control, Inc., Rockford, Ill.

[21] Appl. No.: 324,902

[22] Filed: Nov. 25, 1981

[51] Int. Cl.³ .......................... H04B 7/08; H01Q 3/24
[52] U.S. Cl. .................................. 358/181; 455/277; 343/876
[58] Field of Search .......................... 343/703, 797, 876; 358/181; 455/277, 278

[56] References Cited

U.S. PATENT DOCUMENTS 3,368,151 2/1968 Verwey et al. .................. 455/277

FOREIGN PATENT DOCUMENTS 127690 6/1972 United Kingdom ............... 455/277
1564596 4/1980 United Kingdom ............... 455/277

Primary Examiner—Eli Lieberman
Assistant Examiner—Michael C. Wimer
Attorney, Agent, or Firm—Ted E. Killingsworth; Michael B. McMurray; Harold A. Williamson

[57] ABSTRACT

Automatic selection of a directional antenna providing the best television reception is provided for in an antenna control circuit that includes a circuit for automatically sampling the video output for each directional antenna and connecting the directional antenna that produces the strongest video signal to the receiver. The antenna control circuit includes a timer circuit that responds to the horizontal and vertical synchronizing pulses of the receiver to control the duration and timing of the sampling.

16 Claims, 1 Drawing Figure

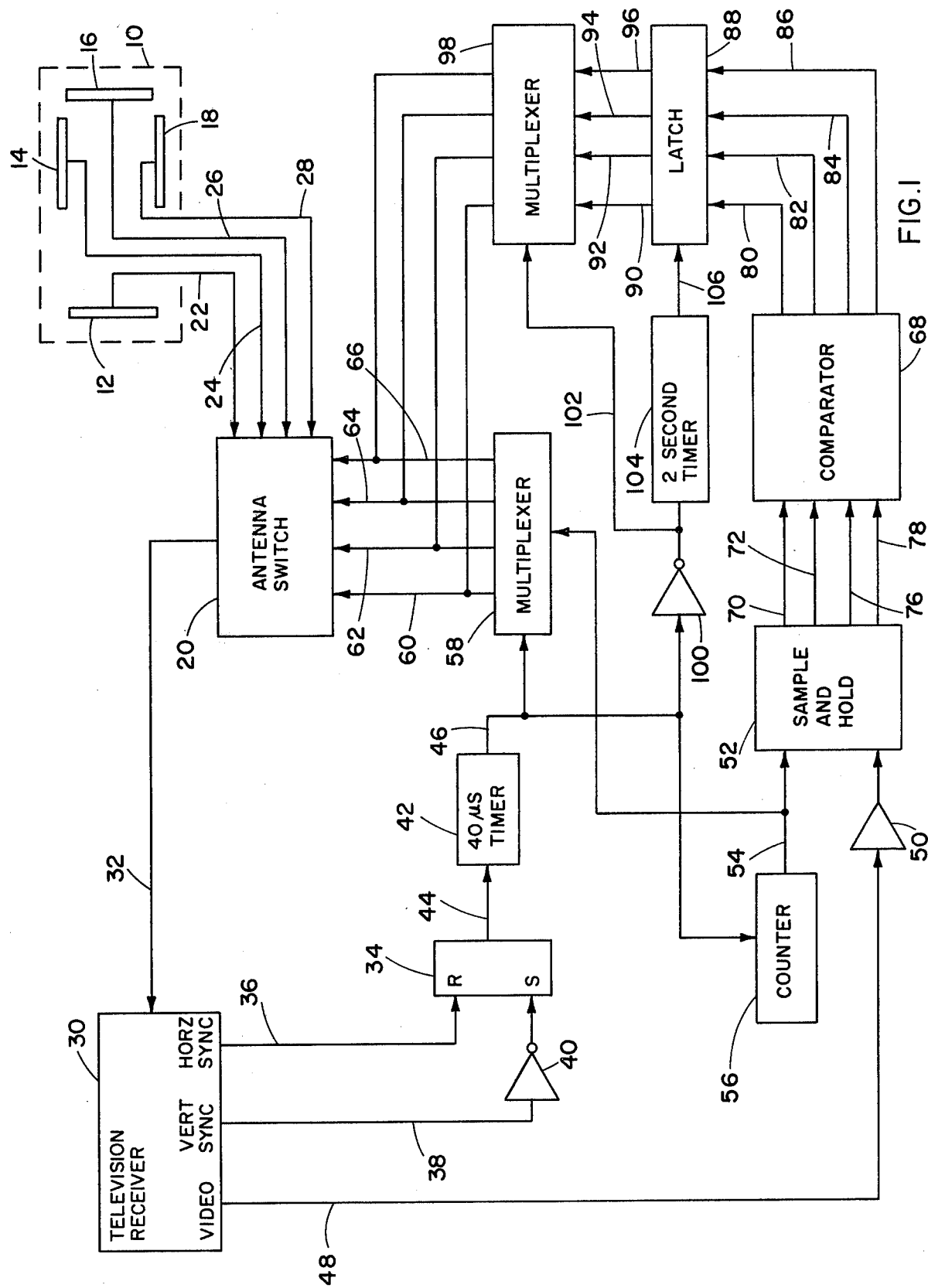

AUTOMATIC TELEVISION ANTENNA CONTROL SYSTEM

TECHNICAL FIELD

The invention relates to the field of television antenna control systems and more particularly to a system for automatically selecting a directional antenna that provides the strongest signal to a television receiver.

BACKGROUND OF THE INVENTION

In most prior art antenna control systems for use with television receivers that either receive signals from television stations located in different directions from the television receiver or are located in vehicles such as aircraft or boats that change their relative orientation with respect to the broadcasting television station, it has been necessary to mechanically rotate the antenna to produce the strongest signal for the television receiver. It has also been proposed to use an antenna system with a group of directional antennas where the particular directional antenna is switched either mechanically or electronically by an operator to provide the best reception.

The rotating mechanical systems have the disadvantage of requiring relatively expensive electromechanical parts that are subject to wear and may be damaged from weather or other causes. However, a more significant disadvantage of these other antenna systems relates to the fact that it is necessary, especially in a vehicle, for continuous operator intervention in order to retain the best reception.

SUMMARY OF THE INVENTION

It is therefore an object of the invention to provide a fully automatic television antenna control circuit for use with a television receiver and an antenna system having a plurality of directional antennas that includes: an antenna switch for connecting each of the directional antennas to the receiver; a sampling circuit for sampling the video output signal of the television receiver for each directional antenna; a comparing circuit for comparing each of the sampled video signals and producing a logic signal that represents the strongest video signal; and an antenna control arrangement for connecting the directional antenna producing the strongest video signal to the receiver in response to the logic signal.

It is an additional object of the invention to provide a television antenna control circuit for use with a television receiver having a group of directional antennas that includes: an antenna switch circuit for connecting each of the directional antennas to the receiver; a sample and hold circuit connected to the video output of the receiver; a timer circuit responsive to at least one of the synchronizing signals of the receiver; a sample switching circuit responsive to the timer circuit and effective to selectively connect each directional antenna to the receiver and to cause the sample and hold circuit to retain a signal representing the strength of the video signal for each directional antenna selected; a comparator circuit for generating a logic signal representing the directional antenna producing the strongest video signal retained in the sample and hold circuit; and a selector circuit connected to the antenna switch circuit and responsive to the logic signal for connecting the directional antenna producing the strongest video signal to the receiver.

It is a further object of the invention to provide a television antenna control circuit for use with a television receiver having a group of directional antennas that includes: an antenna switch circuit effective to connect each of the directional antennas to the receiver; a sample and hold circuit connected to the video output of the receiver; a timer circuit responsive to the vertical synchronizing and horizontal synchronizing pulses of the receiver for producing a timing signal; a counter circuit responsive to the timing signal effective to cause the sample and hold circuit to retain a signal representing the strength of the video signal for each of the directional antennas; a comparator circuit for generating a logic signal representing the directional antenna providing the strongest video signal; a latch circuit connected to the comparator circuit for storing the logic signal; a first multiplexer circuit responsive to the latch circuit for connecting one of the directional antennas to the receiver in response to the logic signal; a second multiplexer circuit connected to the antenna switch circuit for selectively connecting each of the directional antennas to the receiver in response to the counter circuit output; and a latch update circuit connected to the timer circuit and the latch circuit.

BRIEF DESCRIPTION OF THE DRAWING

FIG. 1 is a block diagram of the television antenna control circuit.

DETAILED DESCRIPTION OF THE INVENTION

In FIG. 1 is provided a block diagram of the preferred embodiment of a circuit for automatically selecting a directional antenna that provides the best television reception. A television antenna, indicated generally within the dashed lines 10, includes a group of directional antennas 12, 14, 16 and 18, that are connected to an antenna switch circuit 20 by means of lines 22, 24, 26 and 28. The antenna switch or driver circuit 20 provides a means of connecting the directional antennas 12, 14, 16 or 18 to a television receiver 30 as represented by a line 32.

In order to automatically provide the strongest signal to the television receiver 30 from one of the directional antennas 12, 14, 16 and 18, the video signal produced by the receiver 30 when each of the directional antennas 12, 14, 16 and 18 is connected to the receiver is sampled. To accomplish this a RS flip-flop is connected to a source of the horizontal synchronizing pulses in the television receiver 30 by means of a line 36 connected to the reset input of the flip-flop 34 and a source of the vertical synchronizing pulses from the television receiver 30 is connected by means of a line 38 and through an inverter amplifier 40 to the set terminal of the flip-flop 34. This arrangement results in the flip-flop 34 being set with the vertical synchronizing pulse from the receiver 30 and reset by the horizontal synchronizing pulse from the receiver 30 in response to the falling edge of the vertical synchronizing pulse. It should be noted that typically the vertical synchronizing pulse occurs at about line 11 of the television field. A 40 microsecond timer 42 is connected to the output of the flip-flop 34 by means of a line 44. As a result, a timing signal having about a 40 microsecond duration will be initiated on the output line 46 of the timer circuit 42 when the horizontal synchronizing pulse occurs. This 40 microsecond timing signal represents the sampling period for the automatic antenna control system of FIG. 1.

Connected to the video output terminal of the television receiver 30 by means of a line 48 and a buffer amplifier 50 is a sample and hold circuit 52. Connected to the sample and hold circuit 52 by means of a line 54 is a counter 56 which is incremented by the timing signal on line 46. Thus, for each sample period as represented by the timing signal on line 46, the counter 56 will increment and produce a signal on line 54 that will cause the sample and hold circuit to retain an analog voltage representing the level of the video output signal on line 48 for a particular directional antenna. The counter output on line 54 also is applied to a multiplexer circuit 58 that is connected to the antenna switch circuit 20 by means of line 60, 62, 64 and 66 and is effective to cause the directional antennas 12, 14, 16 and 18 to be sequentially connected to the television receiver 30 in response to the output signals from the counter 56. As a result, the counter 56 serves to both select the directional antenna to be sampled and to control the sample and hold circuitry 52 to store the video signal representing the output of the particular directional antenna being sampled.

Once the video output for each of the directional antennas 12, 14, 16 and 18 has been sampled by the sample and hold circuit 52, a comparator circuit 68 which is connected to the sample and hold circuit 52 by means of lines 70, 72, 76 and 78 will generate a logic signal on one of its output lines 80, 82, 84 or 86. The comparator circuit 68 may be one of any number of a commercially available comparator circuits such as the RCA level comparator circuit CD4073BE. The logic output signal on one of the lines 80, 82, 84 or 86 represents the directional antenna 12, 14, 16 or 18 that is producing the video signal with the strongest output. Connected to lines 80, 82, 84 and 86 is a latch circuit 88 that serves to output the logic signal on one of a number of output lines 90, 92, 94 and 96 to a multiplexer circuit 98 that controls the antenna switch circuit by means of lines 60, 62, 64 and 66. The multiplexer 98 is in turn controlled by the timer pulse on line 46 which is inverted by an inverter circuit 100 and applied to the multiplexer by means of a line 102. As a result, the main multiplexer 98 will control the antenna switch circuit 20 during the time when the timing pulse on line 46 is not present and the sample multiplexer 58 will control the antenna switch circuit 20 during the time when the sample pulse or sample signal is present.

Also connected to the inverter 100 by means of line 102 is a two second timer or update circuit 104 that serves to update the latch circuit 88 by means of a signal on line 106 every two seconds or so, so that the television receiver 30 is effectively connected to one of the directional antennas 12, 14, 16 and 18 for at least a two second interval before a new antenna selection is updated.

To summarize the operation of the preferred embodiment of the invention as illustrated in FIG. 1, during line 11 a particular directional antenna 12, 14, 16 or 18 will be selected and the sample and hold circuit 52 will store an analog voltage that is directionally proportional to the video signal produced by that particular directional antenna. The analog voltage levels are compared by the comparator circuit 68 and the one representing the strongest video signal will determine the directional antenna 12, 14, 16 or 18 that is connected to the receiver 30 except during the sample period which occurs during line 11. It should be also noted that the sampling function takes place during the 40 milliseconds which occurs during retrace so that the sampling function will not be apparent to a viewer.

We claim:

1. A television antenna control circuit for use with a television receiver and an antenna system having a plurality of directional antennas comprising:
   antenna switch means for selectively connecting each of the directional antennas to the television receiver;
   sampling means operatively connected to the television receiver and to said antenna switch means for sampling a video output signal of the television receiver for each directional antenna;
   comparator means operatively connected to said sampling means for comparing said video output signals for each directional antenna selected and generating a logic signal representing the antenna producing the strongest video signal;
   timing means operatively connected to said antenna switch means and said sampling means as well as the television receiver for causing said sampling means to selectively sample the video output signal for each directional antenna for a predetermined amount of time in response to synchronizing signals from the television receiver; and
   antenna control means operatively connected to said comparator means and said antenna switch means for connecting the directional antenna producing the strongest video signal to the television receiver in response to said logic signal.

2. The television antenna control circuit of claim 1 wherein said synchronizing signals are the vertical synchronizing pulses and horizontal synchronizing pulses of the television receiver.

3. The television control circuit of claim 2 wherein said sampling means includes:
   a counter circuit operatively connected to said timing means; and
   a sample and hold circuit operatively connected to said counter circuit and effective to hold a value representing the signal level of said video signal for each directional antenna.

4. The television control circuit of claim 1 wherein said antenna control means include:
   a latch circuit operatively connected to said comparator means; and
   a multiplexer circuit operatively connected to said latch circuit and said antenna switch means effective to cause said antenna switch means to select the directional antenna in response to said logic signal from said latch circuit.

5. The television control circuit of claim 1 including an update means operatively connected to said antenna control means for periodically causing said antenna control means to select the directional antenna producing the strongest video signals.

6. The television control circuit of claim 3 wherein said sampling means includes a circuit operatively connected to said counter circuit effective to cause said antenna switch means to sequentially connect each of the directional antennas to the television receiver.

7. A television antenna control circuit for use with a television receiver and an antenna system having a plurality of directional antennas comprising:

an antenna switch circuit operatively connected between the television receiver and each of the directional antennas;

a sample and hold circuit connected to a video output terminal of the television receiver;

a timer circuit connected to at least one synchronizing signal terminal of the television receiver;

a sample switching circuit connected to said timer circuit, said antenna switch circuit, and said sample and hold circuit for selectively connecting each directional antenna to the television receiver and causing said sample and hold circuit to store a signal representing the strength of the video signal for each directional antenna selected;

a comparator circuit connected to said sample and hold circuit for generating a logic signal representing the directional antenna producing the strongest video signal; and a selector circuit connected to said antenna switch circuit, said timer circuit and said comparator circuit for connecting the directional antenna producing the strongest video signal to the television receiver.

8. The television antenna control circuit of claim 7 wherein said sample switching circuit includes a counter circuit responsive to a signal from said timer circuit.

9. The television antenna control circuit of claim 8 wherein said sample switching circuit additionally includes a multiplexer circuit connected between said counter circuit and said antenna switch circuit effective to cause each directional antenna to be connected to the television receiver in sequence in response to signal from said counter circuit.

10. The television antenna control circuit of claim 7 wherein said selector circuit includes a latch circuit connected to to output of said comparator circuit and responsive to said logic signal for generating an antenna select signal representing the directional antenna with the strongest video signal.

11. The television antenna control system of claim 10 wherein said selector circuit additionally includes a multiplexer circuit connected between said latch circuit and said antenna switch circuit responsive to said antenna select signal, effective to cause the directional antenna producing the strongest video signal to be connected to the receiver.

12. The television antenna of claim 7 additionally including an update circuit connected between said timer circuit and said selector circuit for updating the output of said selector circuit.

13. The television antenna control circuit of claim 7 wherein said timer circuit receives a vertical synchronizing pulse and a horizontal synchronizing pulse from the television receiver.

14. The television antenna control circuit of claim 13 wherein said timing circuit includes a flip-flop circuit which is set by the vertical synchronizing pulse and reset by the horizontal synchronizing pulse.

15. A television antenna control circuit for use with a television receiver and an antenna having a plurality of directional antennas comprising:

an antenna switch circuit operatively connected between the television receiver and each of the directional antennas;

a sample and hold circuit connected to a video output terminal of the television receiver;

a timer circuit connected to the television receiver and adapted to receive a vertical synchronizing pulse and a horizontal synchronizing pulse from the television receiver and to produce a timing signal;

a counter circuit connected to said timing circuit adapted to receive said timing signal with the output of said counter circuit connected to said sample and hold circuit, effective to cause said sample and hold circuit to retain a signal representing the strength of the video signal for each of the directional antennas;

a comparator circuit connected to said sample and hold circuit for generating a logic signal representing the directional antenna with the strongest video signal;

a latch circuit connected to said comparator circuit for storing said logic signal;

a first multiplexer circuit connected between said latch circuit and said antenna switch circuit effective to cause said antenna switch circuit to connect one of the directional antennas to the television receiver in response to said logic signal;

a second multiplexer circuit connected to said counter circuit and said antenna switch circuit for selectively connecting each of the directional antennas to the television receiver in response to said counter circuit output;

a circuit connecting said timer circuit to said first and said second multiplexer circuits; and a latch update circuit connected to said timer circuit and said latch circuit.

16. The television antenna circuit of claim 15 wherein said timing circuit includes a flip-flop circuit which is set by the vertical synchronizing pulse and reset by the horizontal synchronizing pulse.

* * * * *